United States Patent
Kang et al.

(12) 
(10) Patent No.: US 6,697,446 B2
(45) Date of Patent: Feb. 24, 2004

(54) INSTRUMENTED CAPSULE FOR MATERIALS IRRADIATION TESTS IN RESEARCH REACTOR

(75) Inventors: Young-Hwan Kang, Daejeon (KR); Kee-Nam Choo, Daejeon (KR); Bong-Goo Kim, Daejeon (KR); Man-Soon Cho, Daejeon (KR); Jae-Min Sohn, Daejeon (KR); Do-Sik Kim, Daejeon (KR); Jong-Man Park, Daejeon (KR); Jong-Myeong Oh, Daejeon (KR); Sung-Jae Park, Daejeon (KR); Yoon-Taeg Shin, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/219,610

(22) Filed: Aug. 15, 2002

(65) Prior Publication Data

US 2003/0227991 A1 Dec. 11, 2003

(30) Foreign Application Priority Data

Aug. 20, 2001 (KR) ........................................ 2001-50049

(51) Int. Cl.[7] .............................................. G21C 23/00
(52) U.S. Cl. ....................... 376/202; 326/340; 326/341; 326/342
(58) Field of Search ................................. 376/340–345, 376/202, 420, 425–428, 450; 250/505.1–507.1

(56) References Cited

U.S. PATENT DOCUMENTS

| | | | | |
|---|---|---|---|---|
| 3,144,392 A | * | 8/1964 | Chabassier et al. | ........... 176/12 |
| 3,274,067 A | * | 9/1966 | Greebler et al. | ............... 176/68 |
| 3,290,220 A | * | 12/1966 | Mitault et al. | ................. 176/15 |

(List continued on next page.)

FOREIGN PATENT DOCUMENTS

| | | | | |
|---|---|---|---|---|
| JP | 04-131798 | * | 5/1992 | ................. 376/340 |
| JP | 09-145891 | * | 6/1997 | ................. 376/202 |
| JP | 09-211183 | * | 8/1997 | ................. 376/202 |

(List continued on next page.)

OTHER PUBLICATIONS article entitled Temperature Controlled Material Irradiation in the Advanced Test Reactor, By. R.V. Furstenau et al.., published by the U.S. Dept. of Energy Idaho Operations Office and Lockheed Martin Idaho Technologies Company dated 1995.

(List continued on next page.)

Primary Examiner—Jack Keith
(74) Attorney, Agent, or Firm—Bachman & LaPointe, P.C.

(57) ABSTRACT

An instrumented capsule for material irradiation tests in research reactors. The instrumented capsule performs an optimum material irradiation test under a testing environment similar to the operational environment of a real reactor. The capsule minimizes the influence of flow-induced vibration caused by forced-circulation-type coolant flow in a research reactor, and overcomes the problems experienced in the conventional breakable parts of instrumented capsules which may be broken during the process of loading/unloading the capsules in vertical irradiation holes of reactor pools. The instrumented capsule includes a capsule main body installed in the vertical irradiation hole. The capsule main body consists of a shell and several instruments, such as thermocouples, dosimeters, a vacuum control pipe, and heaters housed in the shell. The capsule main body also includes heat media, specimens set in the heat media, insulators interposed between adjacent heat media, upper and lower end plugs to seal the ends of the shell, an upper guide spring unit to vertically place the capsule main body in the irradiation hole, and a reinforced lower fixing unit assembled with the lower end plug. The instrumented capsule also includes a connecting means for connecting the capsule main body to a capsule control system installed outside the reactor pool.

7 Claims, 19 Drawing Sheets

U.S. PATENT DOCUMENTS

| | | | | |
|---|---|---|---|---|
| 3,294,642 A | * | 12/1966 | Recule et al. | 176/15 |
| 3,412,250 A | * | 11/1968 | Arragon et al. | 250/106 |
| 3,549,492 A | * | 12/1970 | Ricci et al. | 176/15 |
| 3,679,545 A | * | 7/1972 | Leirvik | 176/68 |
| 3,719,555 A | * | 3/1973 | Davis | 176/17 |
| 4,464,331 A | * | 8/1984 | Bezer et al. | 376/202 |
| H63 H | * | 5/1986 | Vogel et al. | 250/491.1 |

FOREIGN PATENT DOCUMENTS

| | | | | |
|---|---|---|---|---|
| JP | 09-211200 | * | 8/1997 | 376/202 |
| JP | 10-213695 | * | 8/1998 | 376/202 |
| JP | 11-118983 | * | 4/1999 | 376/202 |
| JP | 2001-337193 | * | 12/2001 | 376/202 |
| JP | 2003-121589 | * | 4/2003 | 376/340 |

OTHER PUBLICATIONS article entitled Programmed Temperature Control of Capsule in Irradiation Test with Personal Computer at JMTR, By Saito et al., published Department of JMTR Project, Oarai Research Establishment, JAERI, pp. 295–302, 1992.

article entitled Development of Material Irradiation RIG with Precision Temperature Control in Experimental Fast Reactor Joyo, By H. Kataoka et al., Journal of Nuclear Materials 258–263 (1998) 677–681.

* cited by examiner

--Fig. 1--
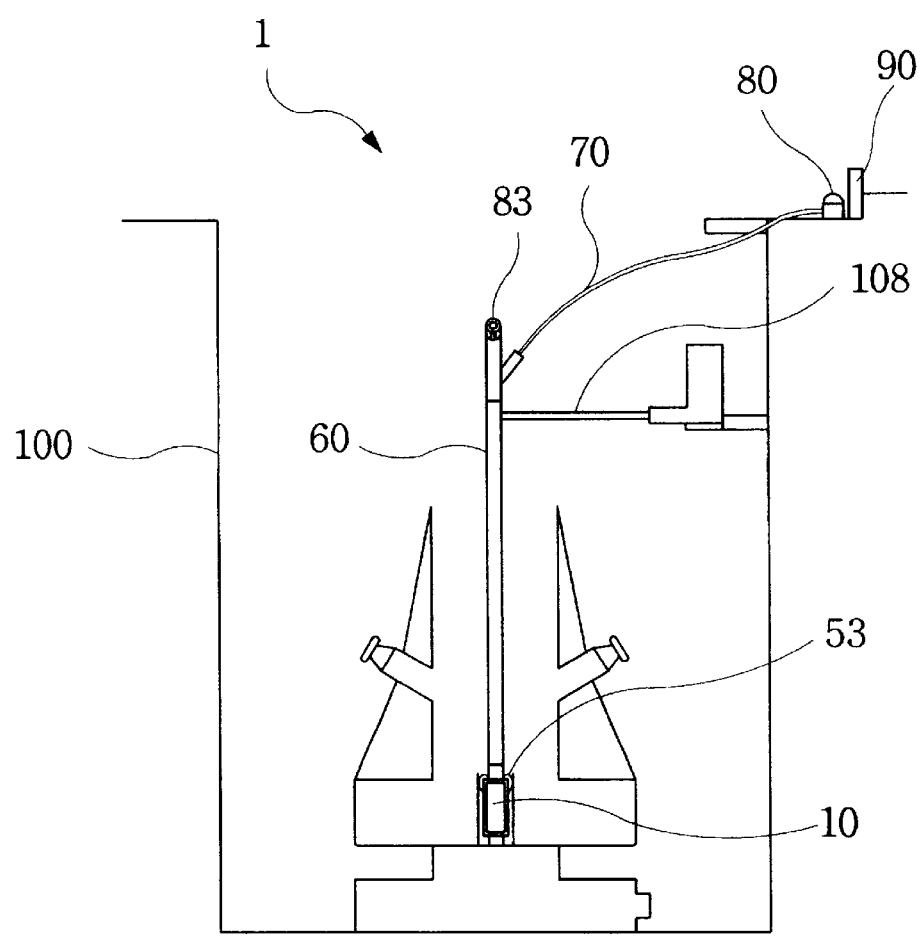
Contemporary Art

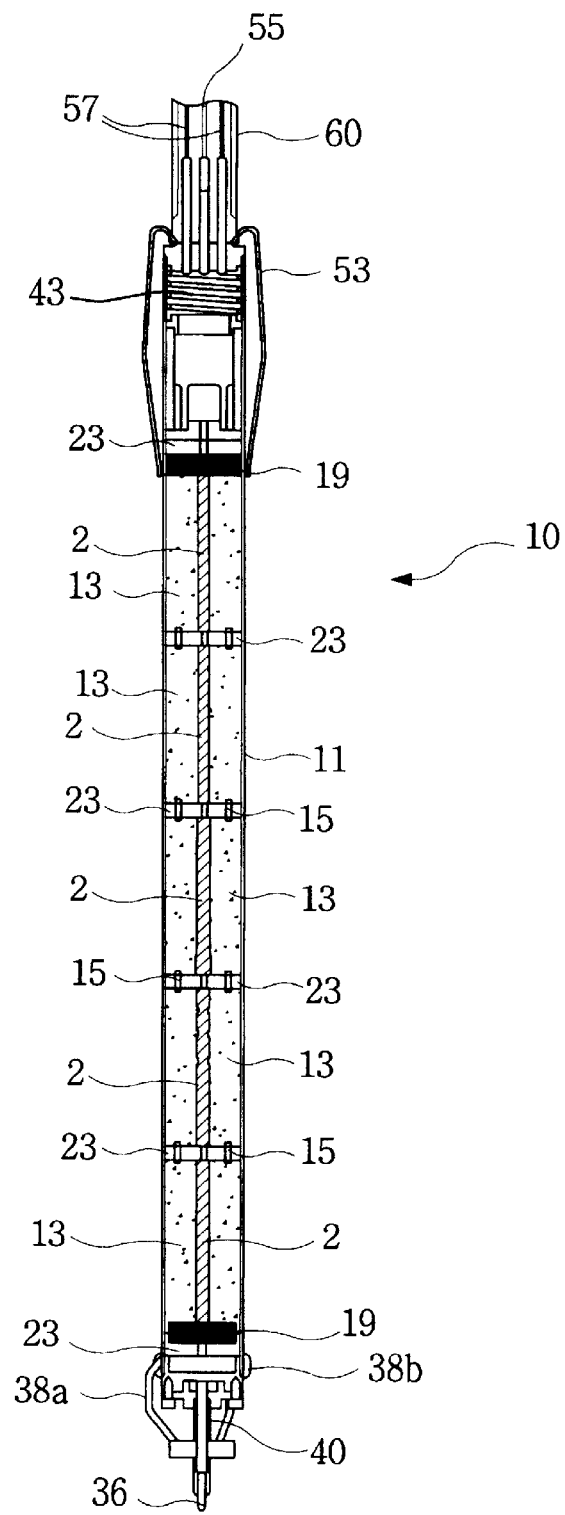
--Fig. 2--

--Fig. 3--
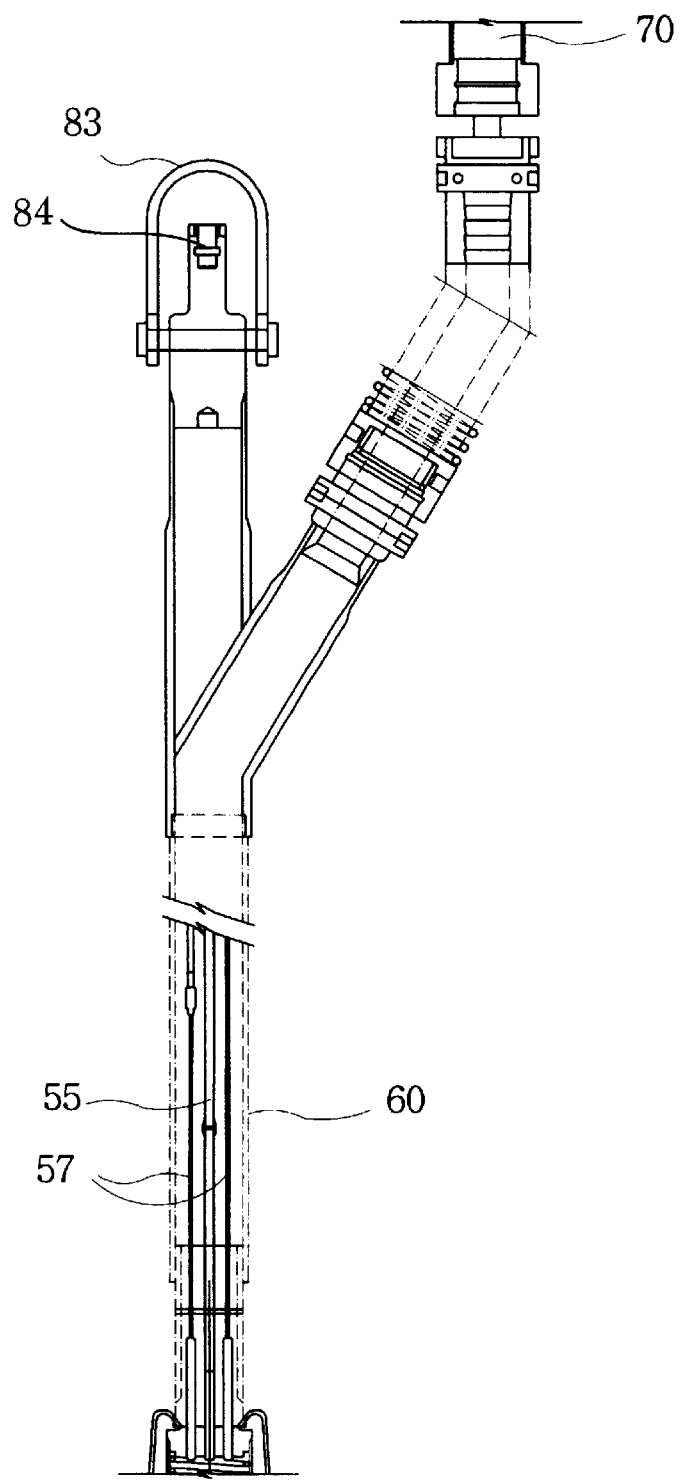

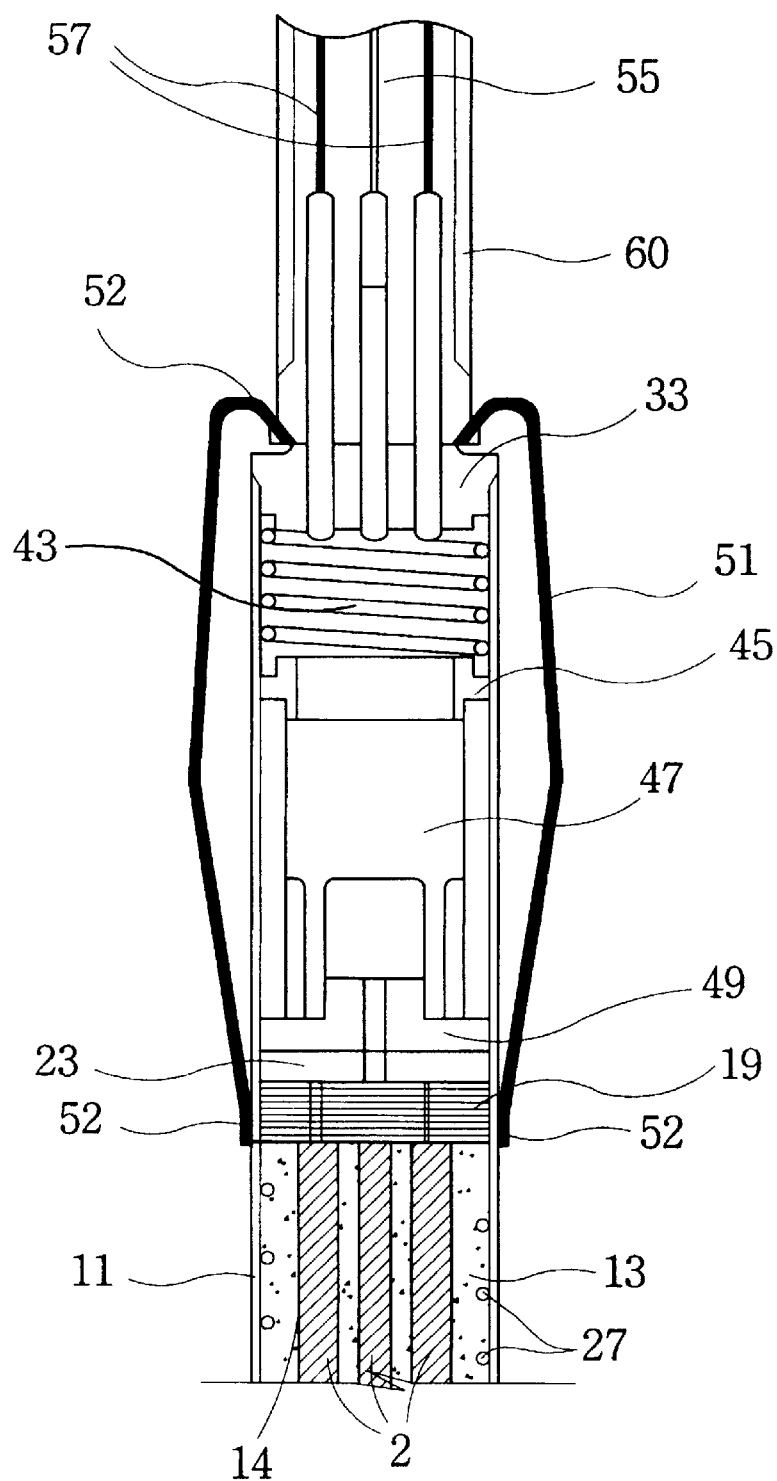
--Fig. 4a--

--Fig. 5a--
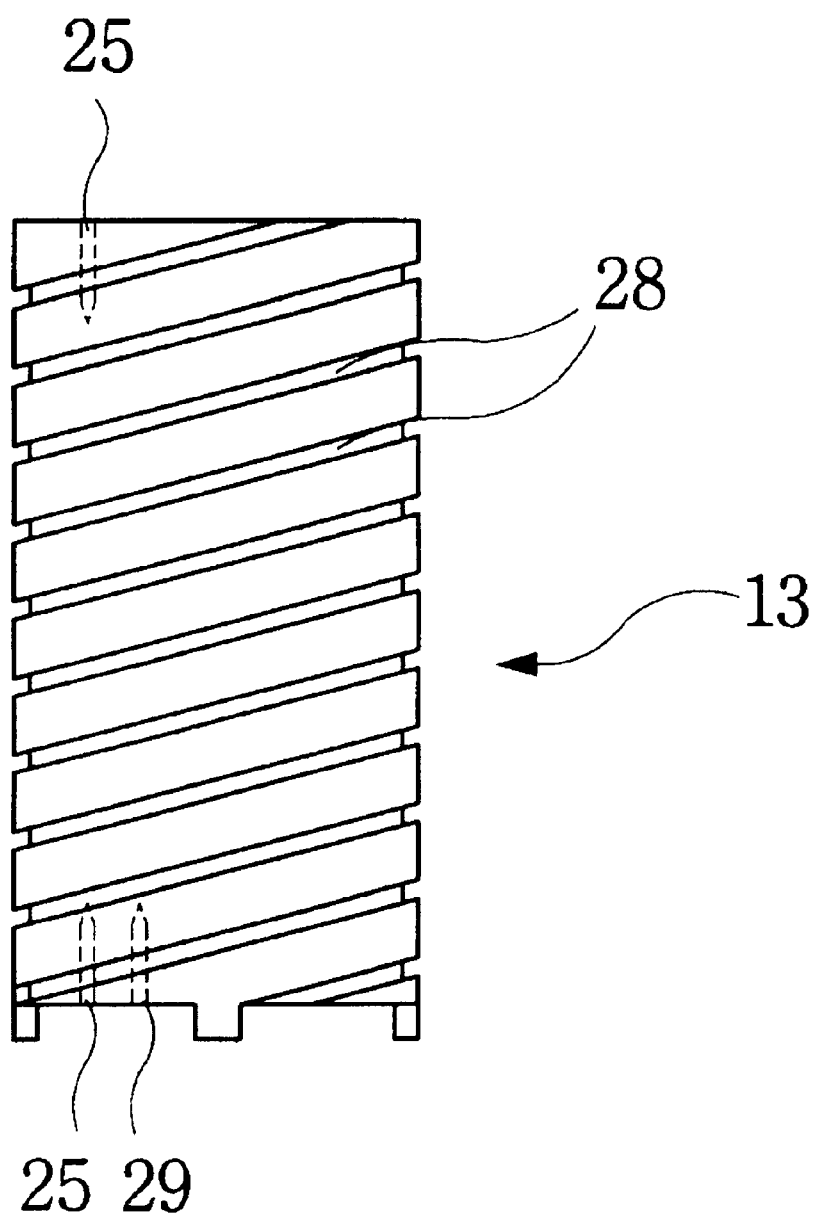

--Fig. 5b--
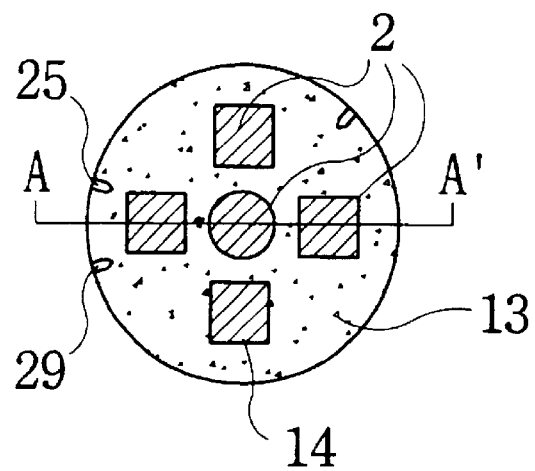
--Fig. 5c--
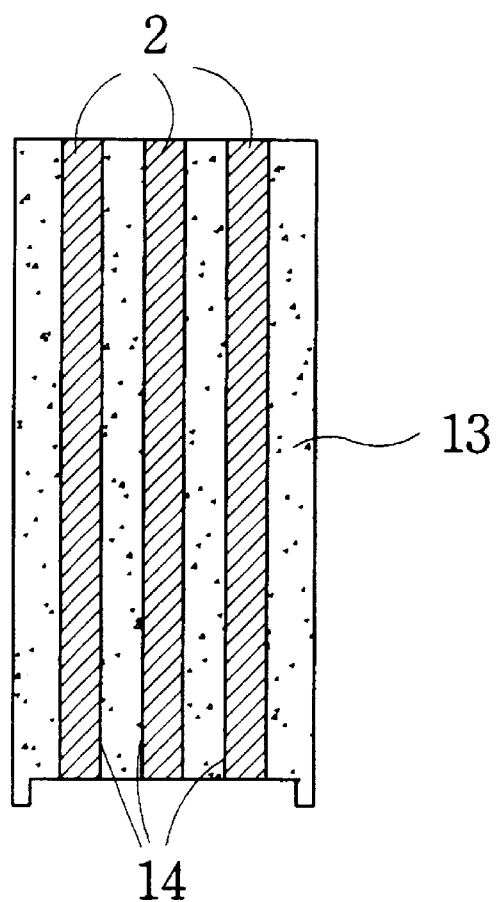

--Fig. 5d--
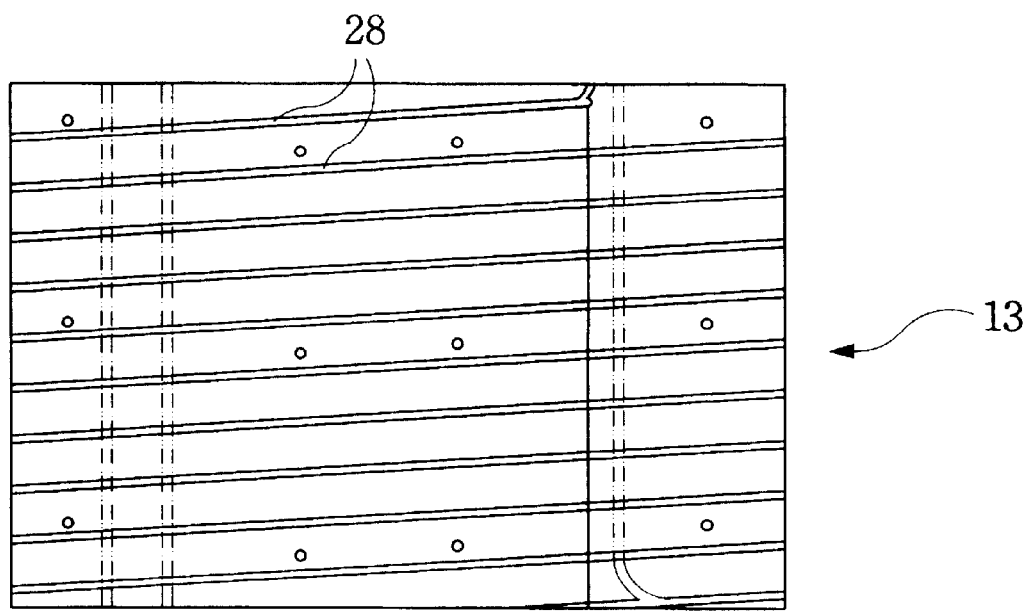

--Fig. 6a--
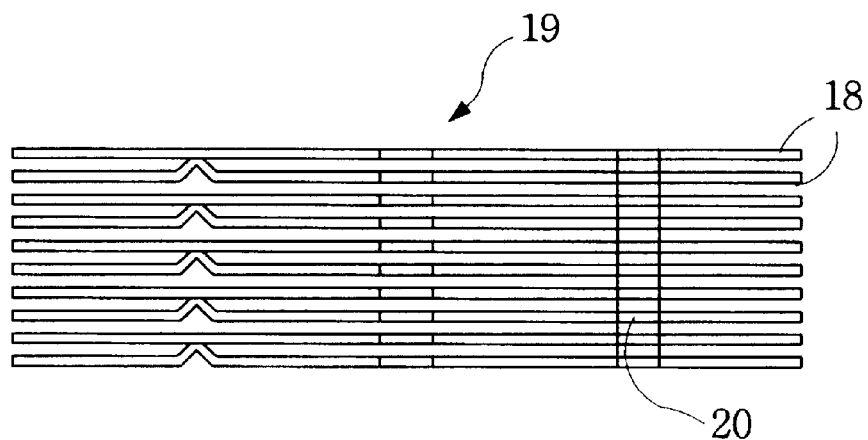
--Fig. 6b--
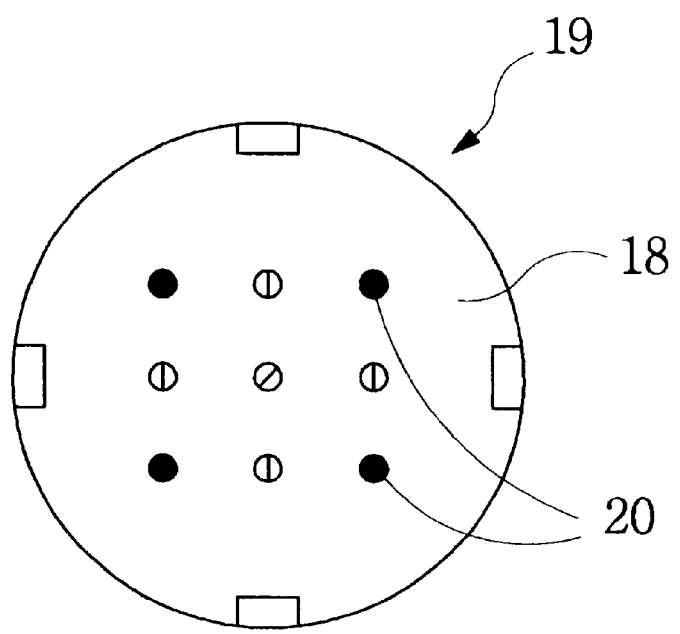

--Fig. 7a--
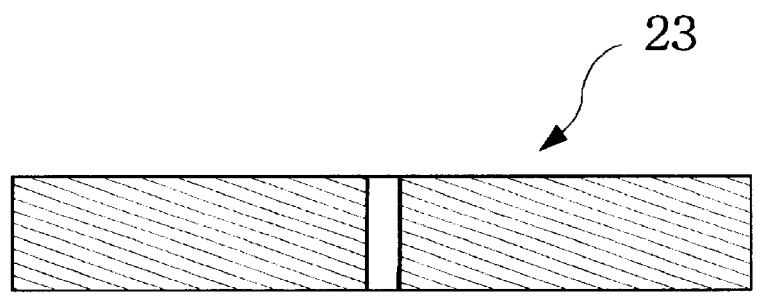
--Fig. 7b--
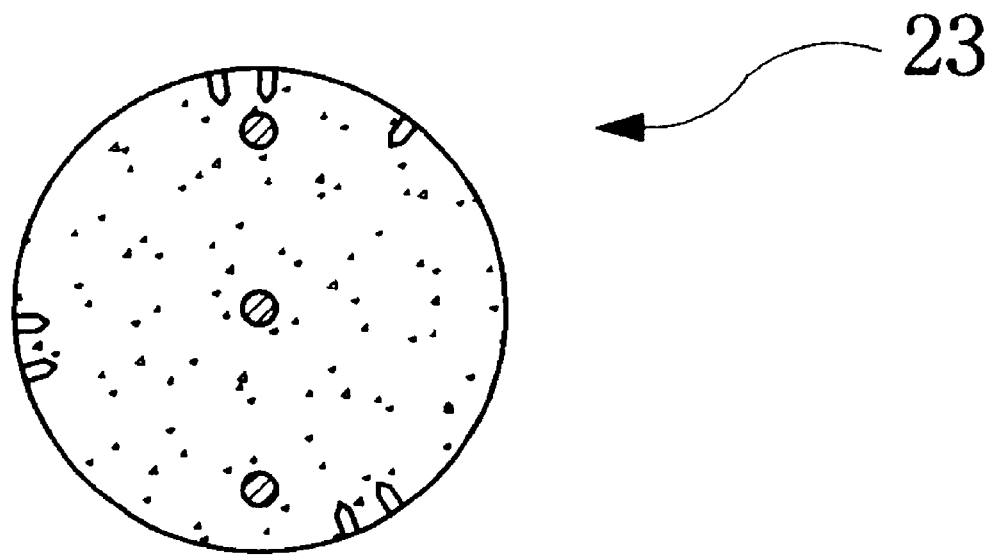

--Fig. 8--
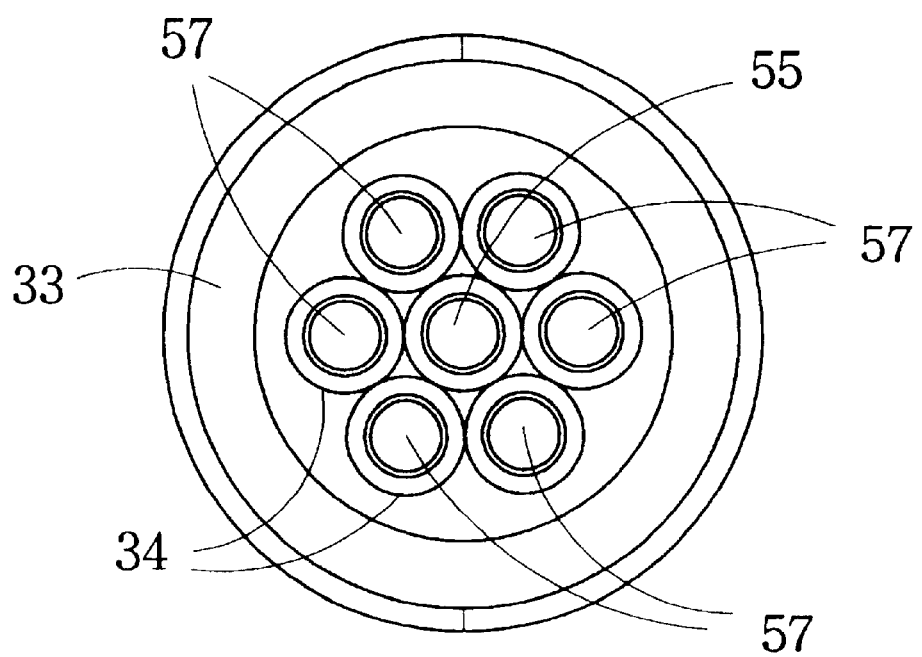

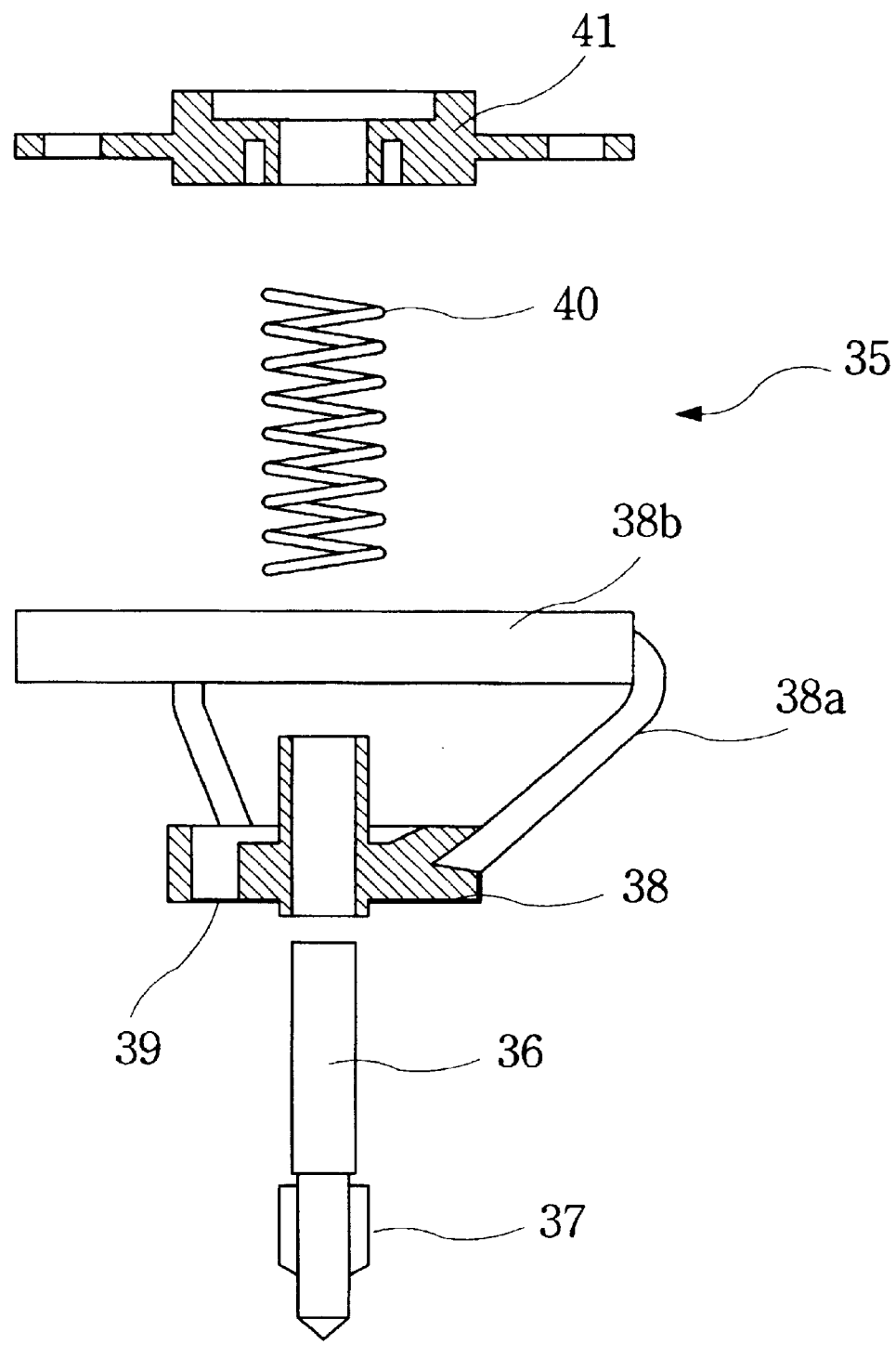
--Fig. 9a--

--Fig. 9b--
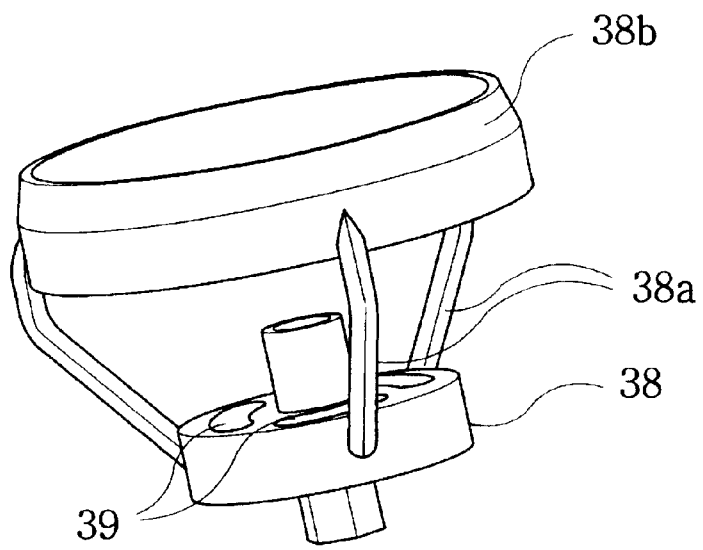
--Fig. 9c--
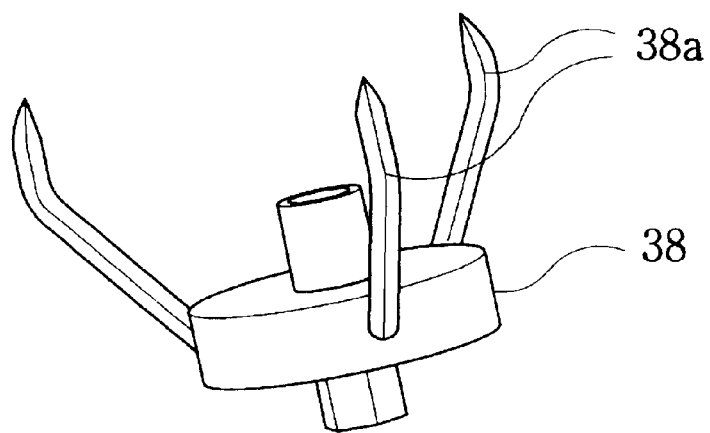

--Fig. 10--
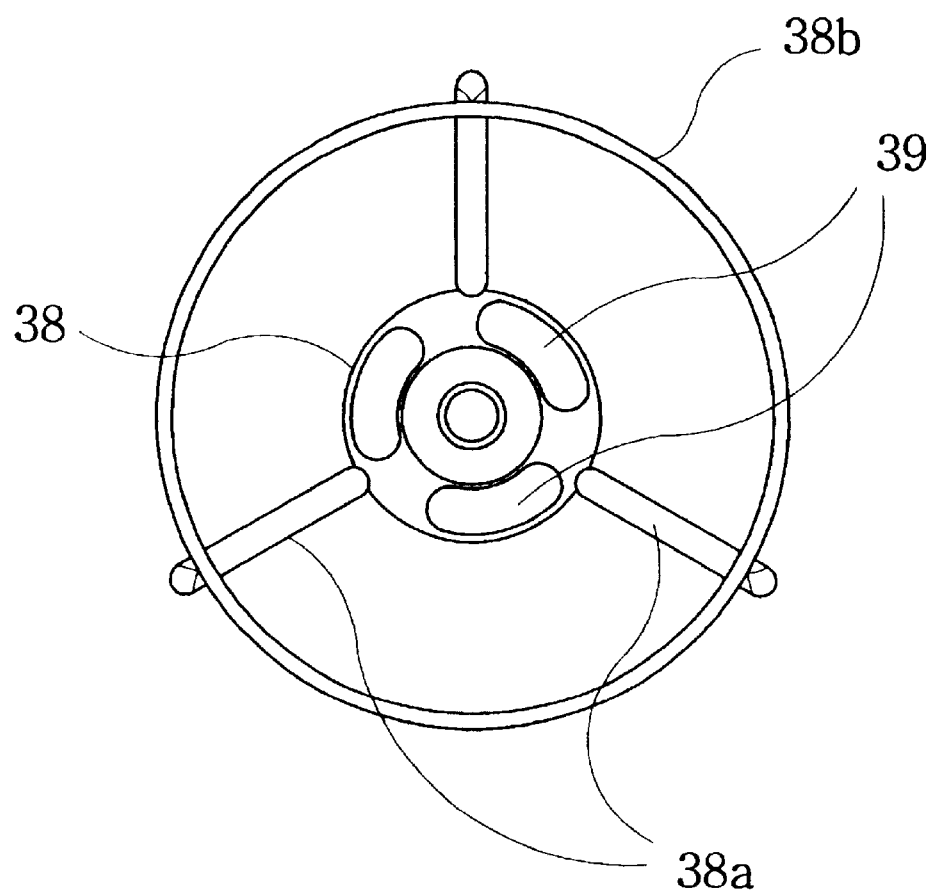

--Fig. 11--
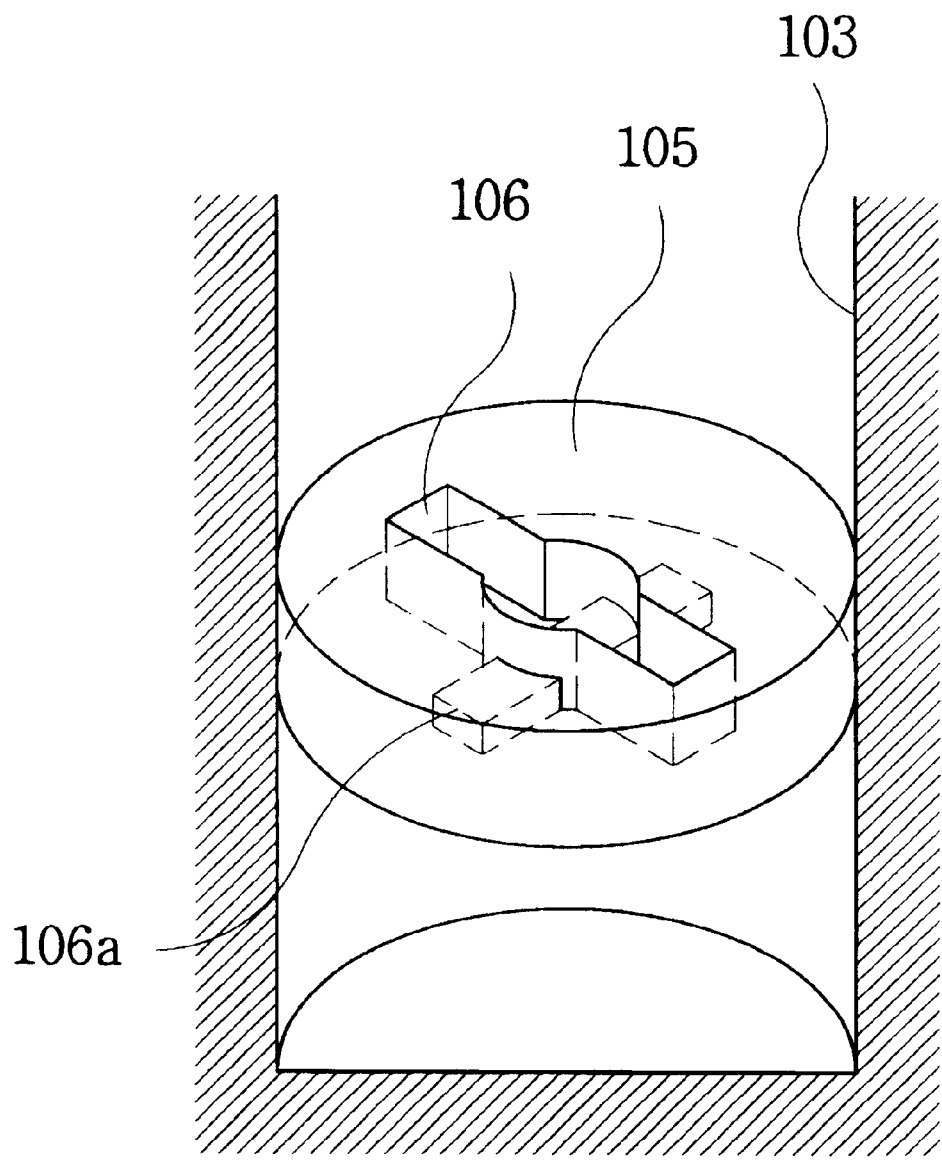
Contemporary Art

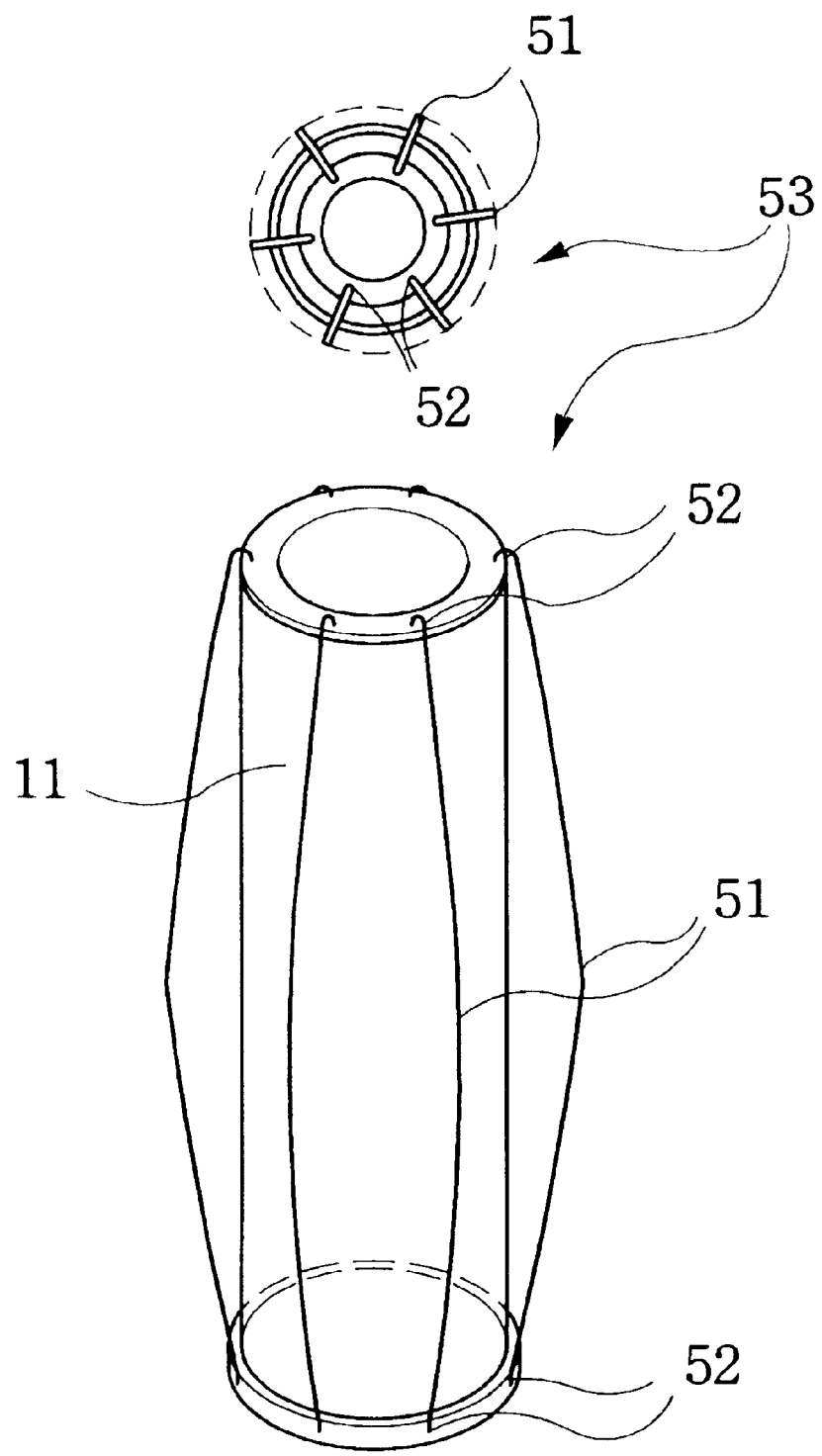

--Fig. 13a--
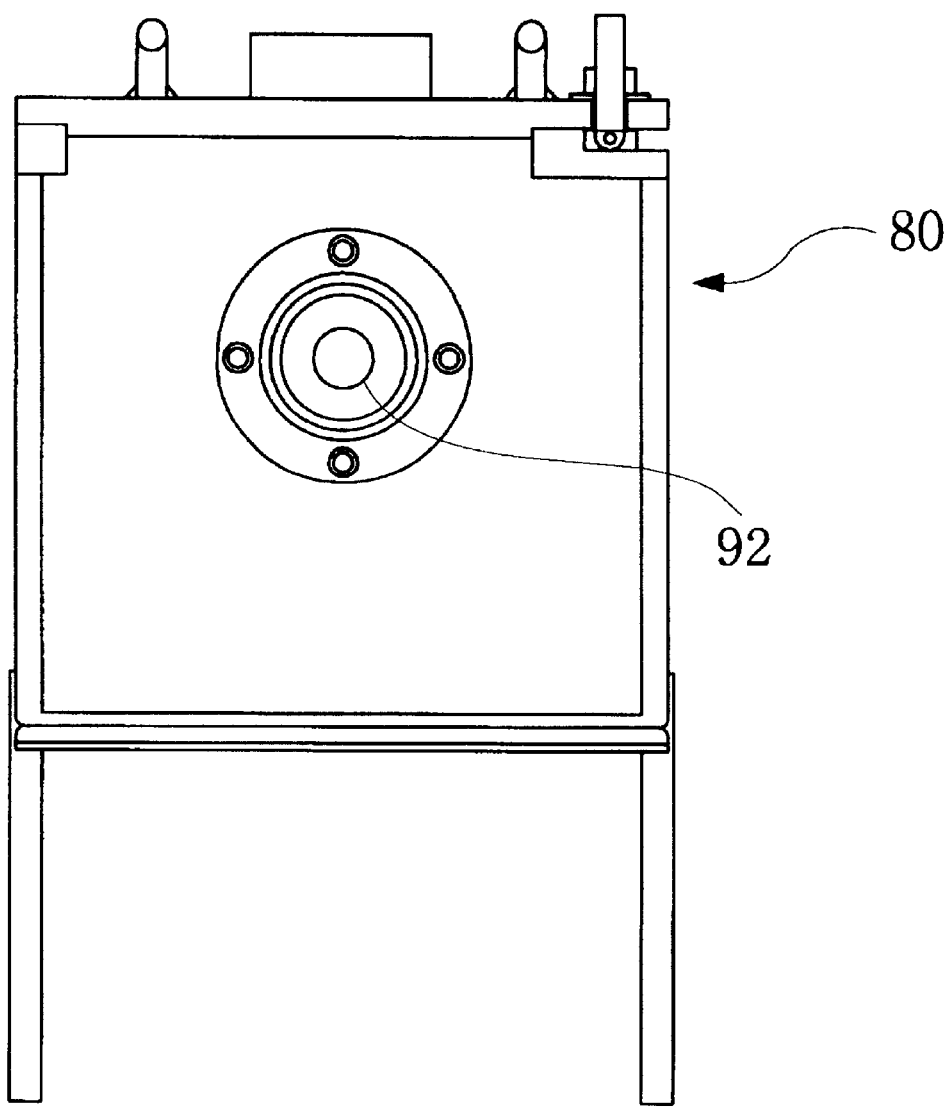

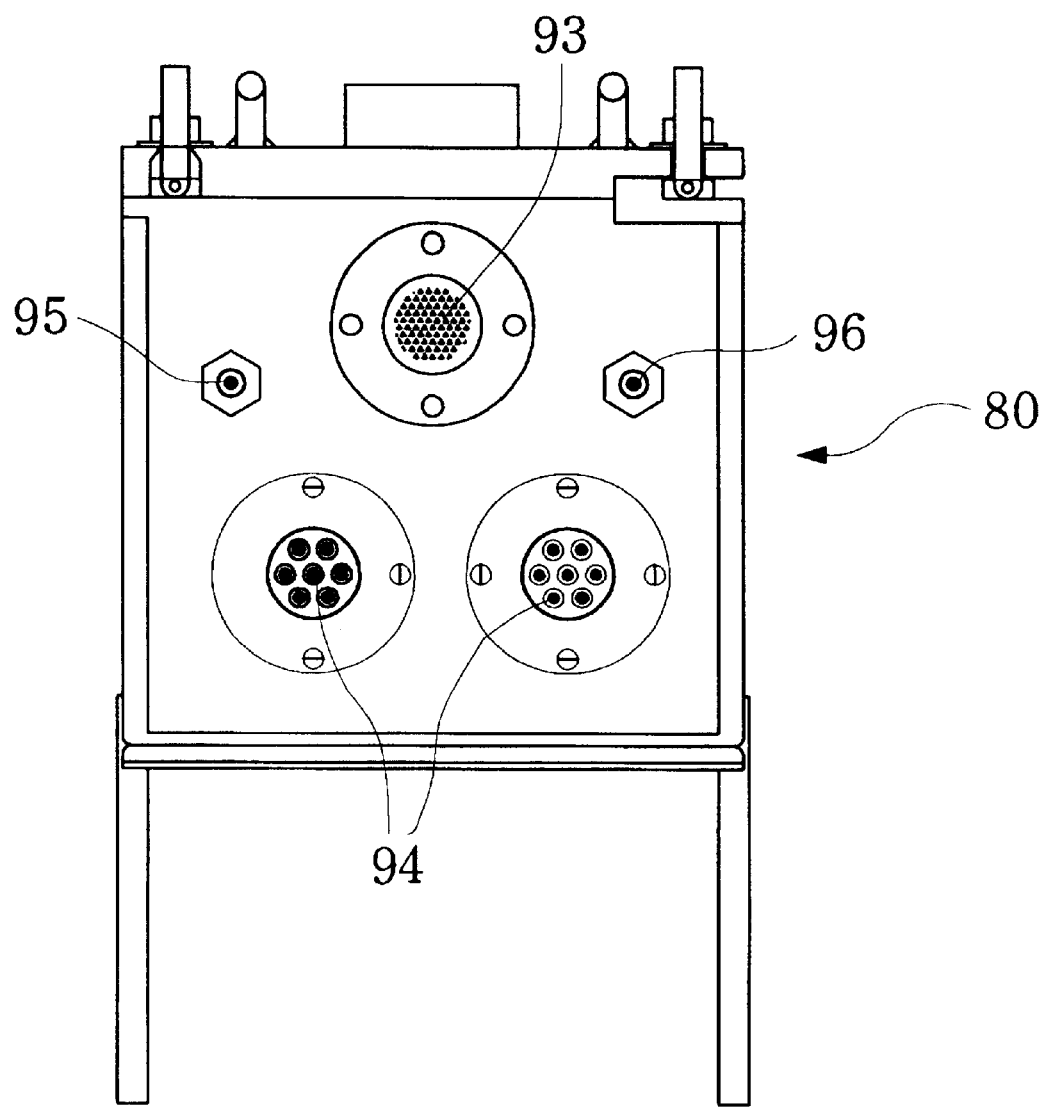
--Fig. 13b--

--Fig. 14--
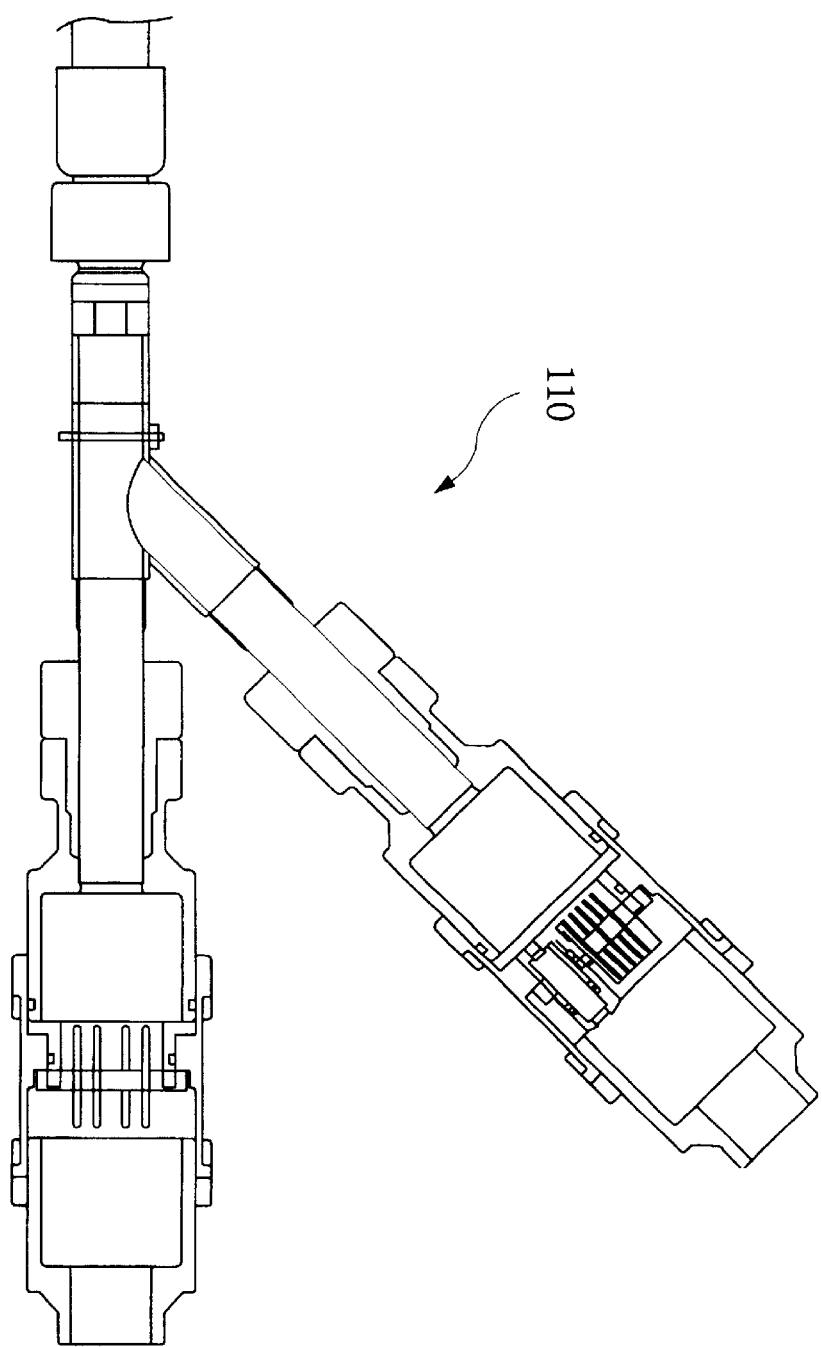
Contemporary Art

INSTRUMENTED CAPSULE FOR MATERIALS IRRADIATION TESTS IN RESEARCH REACTOR

BACKGROUND OF THE INVENTION

1. Field of the Invention

The present invention relates to an instrumented capsule for the material irradiation tests, which is designed to monitor the irradiation history of specimens and simultaneously to control the environment during material irradiation tests.

2. Description of the Prior Art

There are several essential prerequisites to be solved for developing new types of nuclear reactors, such as next generation reactors. For example, it is necessary to qualify fuel and structural material performance that is compatible with the features of advanced reactors in the design stage. The important essential prerequisites for the development of nuclear reactors are the close examination into several phenomena related to irradiation in reactors, and the development of advanced materials with the resistance of irradiation aging.

In recent years, next generation light water reactors (NGLR), advanced pressurized water reactors (APWR) and liquid metal reactors (LMR) have been actively studied and developed, and, therefore, advanced structural materials and fuels which are compatible with the features of such reactors are under active study and development. When designing such reactors, it is necessary to evaluate and determine neutron resistance of conventional structural materials or advanced structural materials that may be used in the reactors.

Degradation in structural material performance caused by a reduction in a variety of mechanical properties of materials, due to irradiation of fast neutrons to the materials in a real nuclear reactor, is the most serious factor, resulting in a reduction in both integrity and life span of a nuclear power plant.

Therefore, material irradiation testing in research reactors for qualification of neutron resistance of structural materials is recognized as a very important test for developing advanced structural materials or for newly planning the essential components of reactors.

Such material irradiation test in research reactor has been typically performed with the use of various material testing facilities. Such a material testing facility includes an in-pile test section, a so-called "capsule". The capsule is the most important unit of the material testing facility, which houses specimens of a variety of target materials and is installed in an irradiation hole of the research reactor. The conventional capsules used in the material irradiation tests are classified into two types: instrumented capsules and non-instrumented capsules. The instrumented capsule has a connection channel through which control wires pass to connect the instruments of the capsule to a capsule control system installed outside the reactor pool, so it is possible to remotely control the test environments of the capsule, such as the inner temperature and atmosphere of the capsule, during a material irradiation test. On the contrary, the non-instrumented capsule does not have such a connection channel, so it is impossible to control the test environment of the capsule during a material irradiation test.

In other words, the non-instrumented capsule is an in-pile test unit lacking any means for remotely controlling the inner temperature and atmosphere of the capsule, so the irradiation temperature and atmosphere for target specimens housed in the capsule cannot be controlled. Therefore, the non-instrumented capsule, during a material irradiation test, does not provide a testing environment similar to the operational environments of real reactors. However, the instrumented capsule, related to the present invention, is an in-pile test section provided with an improvement in design of such a non-instrumented capsule. The construction of such instrumented capsules may be variously designed in accordance with irradiation test purposes, and may be equipped with various instruments, such as a thermocouple, a sub-heater, a pressure sensor, a strain gauge, and a dosimeter, in accordance with irradiation test purposes.

Uses of the instrumented capsules are wide, such that the capsules are preferably used in the qualification of nuclear fuel materials performance. However, the instrumented capsule related to the present invention is limitedly used in the qualification of performance of a variety of materials of reactor's essential elements, other than fuel.

The main body 10 of an instrumented capsule 1 comprises heat media 13 collaterally acting as specimen holders at portions 14, specimens 2, dosimeters 29, and thermocouples 25, which are housed in a stainless steel shell 11 as shown in FIGS. 4a, 5a and 5b. The shell 11 of the capsule is a cylindrical body of about 1 m in length and 60 mm in outer diameter. The instrumented capsule also has a vacuum control pipe and heaters. The vacuum control pipe is used for controlling the pressure of helium gas in the capsule main body to control the degree of vacuum in said capsule main body, while the heaters are used for heating the specimens 2 in order to control the temperature of the specimens 2 during a material irradiation test. In the pool of a research reactor, a protection tube extends from the top end of the shell of the capsule installed in an irradiation hole, while a guide tube extends from the protection tube to a junction box. The protection tube and the guide tube, both air- and water-tight, guide the vacuum control pipe and the control wires while isolating them from coolant. The junction box connects the vacuum control pipe and the control wires to the capsule control system. Due to this unique construction of the instrumented capsule, it is possible to easily accomplish target irradiation temperature of specimens housed in the capsule, so an optimum material irradiation test under a testing environment similar to the operational environment of a real reactor may be accomplished.

The junction box has a role of connecting the capsule main body, installed in the irradiation hole of the reactor pool, and the capsule control system, installed at the upper portion of the research reactor, and connects the vacuum control pipe and a variety of control wires, such as a heater control wire and a thermocouple control wire, to the capsule control system. In such a case, the vacuum control pipe and the control wires extend from the interior of the shell of the capsule main body to the junction box guided by a protection tube and a guide tube. The junction box is an essential instrument necessarily used for detecting and controlling the specimen temperature during a material irradiation test. However, non-instrumented capsules do not have such a junction box. In the prior art, a junction box 110 of FIG. 14 has been used as the junction means. However, the conventional junction unit 110 has a complex construction with several problems whenever connecting the vacuum control pipe to the capsule control system within a limited space. The complex construction of the junction box 110 also causes difficulty in operation and fabrication of the instrumented capsules. In addition, the junction box 110 is quite heavy, thus sometimes overloading the flexible guide tube during a process of moving, loading or unloading the capsule main body in a research reactor. In such a case, the guide tube may be excessively bent at a radius of curvature larger than an allowable radius of curvature, thus causing severe problems.

Furthermore, The desired structural integrity of instrumented capsules and related systems for in-pile material irradiation tests must be accomplished. In an effort to secure such structural integrity of the instrumented capsules and related systems, it is necessary to perform a seismic analysis and structural analysis of the instrumented capsules and related systems in terms of dead loads, operational basic earthquake (OBE) and safe shutdown earthquake (SSE) in accordance with regulations of AMSE B&PV Code, Section III, Div. 1, Part NF. Particularly, since the irradiation hole of a reactor pool, in which the capsule main body is loaded, is located at a forced convectional area, the essential instruments of the capsule must be designed in consideration of several important design factors.

In the case of a typical research reactor in which coolant flows upward, the capsule for material irradiation tests is loaded into a vertical irradiation hole inside a reactor pool. However, due to forced-circulation-type coolant flow in such a research reactor, the capsule may be vibrated in the irradiation hole, so structural integrity of the capsule and related systems must be maintained. Therefore, a variety of capsule fixing devices and capsule loading/unloading methods compatible with the features of research reactors have been developed and used. The capsule fixing devices are used for fixing the capsules in the reactor pools during material irradiation tests, and the capsule loading/unloading methods are for loading and unloading of the capsule main bodies in the irradiation holes inside the reactor pools before and after the material irradiation tests.

In order to fix a capsule main body in an irradiation hole of a reactor pool before a material irradiation test, a grapple head 84, provided at the uppermost end of the capsule main body, as shown in FIG. 3, is rotated. When the grapple head 84 is rotated during the process of fixing the capsule main body, a torsion force is applied to the capsule main body. The capsule main body is thus stressed by the torsion force, and, in such a case, the guide pins 38a provided at the lower portion of the capsule main body may become overstressed leading to breakage. Therefore, the guide pins 38a must be designed such that they effectively endure such torsion force.

The inventors of the present invention thus have developed an instrumented capsule which houses specimens of various target materials and is equipped with a variety of instruments for controlling the temperatures of the specimens during a material irradiation test, and maintains desired structural integrity when the capsule is loaded into an irradiation hole of a research reactor pool, and which more effectively performs the material irradiation test in the research reactor.

SUMMARY OF THE INVENTION

Accordingly, the present invention has been made keeping in mind the above problems occurring in the prior art, and an object of the present invention is to provide an instrumented capsule for material irradiation tests in research reactors which is designed such that it houses specimens of target materials in its shell and easily and precisely controls the irradiation condition and the irradiation temperature, thus performing a material irradiation test under an optimum test environment, such as an irradiation temperature similar to the operational temperature of a real reactor.

Another object of the present invention is to provide an instrumented capsule for material irradiation tests in research reactors which has a guide spring means in addition to a conventional capsule fixing device, thus being stably held in an irradiation hole of a reactor pool while being prevented from excessive vibration caused by flow-induced vibration, and which does not interfere with adjacent structures during material irradiation tests, but safely performs the irradiation tests.

A further object of the present invention is to provide an instrumented capsule for material irradiation tests in research reactors which has a simple and safe junction box for simply and safely connecting a vacuum control pipe and a variety of control wires, such as a heater control wire and a thermocouple control wire, to a capsule control system installed outside a research reactor pool, and also which has a fixing unit capable of supporting the capsule main body in an irradiation hole of the reactor pool while maintaining the desired structural integrity of the capsule in the reactor pool where coolant flows upward, thus being compatible with the features of capsule loading/unloading methods.

In order to accomplish the above objects, the present invention provides an instrumented capsule for material irradiation tests in research reactors, including a capsule main body installed in a vertical irradiation hole of a research reactor pool, the capsule main body consisting of a shell opened at upper and lower ends thereof, a plurality of heat media set in the shell, a plurality of specimens set at a center and peripheral areas of each of the heat media, upper and lower reflectors installed on an upper end of an uppermost heat medium and under a lower end of a lowermost heat medium, respectively, a plurality of insulators interposed between adjacent heat media and positioned above and under the upper and lower reflectors, respectively, a spacer set in the shell at a position above an uppermost insulator, a spring seat installed above the spacer, a specimen compressing spring to bias the spring seat, thus compressing the specimens, a temperature control means for controlling a temperature inside the shell, the temperature control means consisting of a vacuum control pipe and a heater, a detecting means consisting of both a thermocouple used for detecting a temperature of the specimens and a dosimeter used for detecting a quantity of neutron radiation, upper and lower end plugs mounted to the upper and lower ends of the shell so as to seal the ends of the shell, and a lower fixing unit assembled with the lower end plug, and a connecting means for connecting the capsule main body to a capsule control system installed outside the reactor pool.

In the instrumented capsule, the shell of the capsule main body is a cylindrical body of about 0.6 m in diameter and 1 m in length. In order to stably and safely perform the material irradiation tests, an upper guide spring unit is fitted over the upper end of the shell so as to vertically place the capsule main body at the center of the vertical irradiation hole inside and minimize the influence of flow-induced vibration caused by forced-circulation-type coolant flow in the research reactor. The upper guide spring unit consists of upper and lower fixing rings, and a plurality of wire springs connected between the upper and lower fixing rings at regular intervals.

The temperature control means includes the vacuum control pipe and the heater. The vacuum control pipe is connected to the upper end of the capsule main body and controls the degree of vacuum in the capsule main body, thus controlling the quantity of transferred heat. The heater heats the specimens so as to control the temperature of the specimens. The control of the degree of vacuum and heater's operation is performed in response to a signal indicative of specimens' temperature detected by the thermocouples.

The connecting means includes a rigid protection tube connected to an upper end of the capsule main body so as to air- and water-tightly guide the vacuum control pipe and the control wires extending from the thermocouple and the heater inside the capsule main body while protecting the vacuum control pipe and the control wires, a flexible guide tube connected to the protection tube so as to guide the vacuum control pipe and the control wires, and a junction box connected to the guide tube pipe so as to connect the vacuum control pipe and the control wires to the capsule control system installed outside the reactor pool, thus acting as a medium which transmits signals to the capsule control system.

The lower fixing unit includes a lower end cap mounted to the lower end plug, a rod tip connected to a center of the lower end cap and vertically extending downward, with a plurality of locking blades formed on a lower portion of the rod tip and locked to a fixing slot formed on a receptacle provided in the irradiation hole, a stopper movably fitted over the rod tip, and a stopper spring fitted over the rod tip at a position between the stopper and the lower end cap, thus normally biasing the stopper downward in a vertical direction.

The stopper of the lower fixing unit includes a plurality of holes formed in the stopper so as to allow a coolant flowing from the bottom of the irradiation hole to smoothly flow upward through the stopper without being disturbed by the stopper, and a plurality of guide pins projected on a circumferential surface of the stopper in radial directions such that the guide pins come into contact with the inner surface of the irradiation hole when the capsule main body is installed in the irradiation hole.

The stopper also includes an annular ring that connects the outside ends of the guide pins so as to support the guide pins.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic view showing an instrumented capsule according to a preferred embodiment of the present invention, which is installed in an irradiation hole of a research reactor and performs a material irradiation test;

FIG. 2 is a sectional view of a main body of the instrumented capsule according to the present invention;

FIG. 3 is a sectional view of a tube structure used for guiding a vacuum control pipe and several control wires from the capsule main body to a capsule control system installed outside the reactor pool while protecting the pipe and wires;

FIGS. 4a and 4b are sectional views of parts of the capsule main body, in which:

FIG. 4a is a sectional view of an upper part of the capsule main body; and

FIG. 4b is a sectional view of a lower part of the capsule main body;

FIGS. 5a to 5d are views of a heat medium housed in the shell of the capsule main body of the present invention, in which:

FIG. 5a is a front view of the heat medium;

FIG. 5b is a plan view of the heat medium, with several specimens axially set at the center and peripheral areas of the heat medium;

FIG. 5c is a longitudinal sectioned view of the heat medium taken along the line A–A' of FIG. 5b; and FIG. 5d is a development view of the heat medium;

FIGS. 6a and 6b are views of a reflector housed in the shell of the capsule main body according to the present invention, in which:

FIG. 6a is a sectional view of the reflector; and

FIG. 6b is a plan view of the reflector;

FIGS. 7a and 7b are views of an insulator housed in the shell of the capsule main body according to the present invention, in which:

FIG. 7a is a sectional view of the insulator; and

FIG. 7b is a plan view of the insulator;

FIG. 8 is a sectional view of an upper end plug included in the capsule main body according to the present invention;

FIGS. 9a to 9c are views of a lower fixing unit of the capsule main body according to the present invention, in which:

FIG. 9a is an exploded sectional view of the lower fixing unit of the present invention;

FIG. 9b is a perspective view of a guide pin assembly used in the lower fixing unit according to the present invention, with three guide pins being held by a holding ring at their ends; and FIG. 9c is a perspective view of a conventional guide pin assembly, with three guide pins being left free at their ends;

FIG. 10 is a plan view of a stopper included in the lower fixing unit of the present invention;

FIG. 11 is a perspective view of a receptacle provided in the irradiation hole of the research reactor;

FIG. 12 shows the construction of a guide spring included in the capsule main body of the present invention, in a sectional view and a perspective view;

FIGS. 13a and 13b are views of a junction box used for connecting the heater control wire, thermocouple control wire, and vacuum control pipe of the capsule to the capsule control system according to the present invention, in which:

FIG. 13a is a front view of the junction box; and

FIG. 13b is a rear view of the junction box; and

FIG. 14 is a view of a conventional junction unit used for connecting the heater control wire, thermocouple control wire, and vacuum control pipe to a capsule control system.

DETAILED DESCRIPTION OF THE INVENTION

Figure 4B:
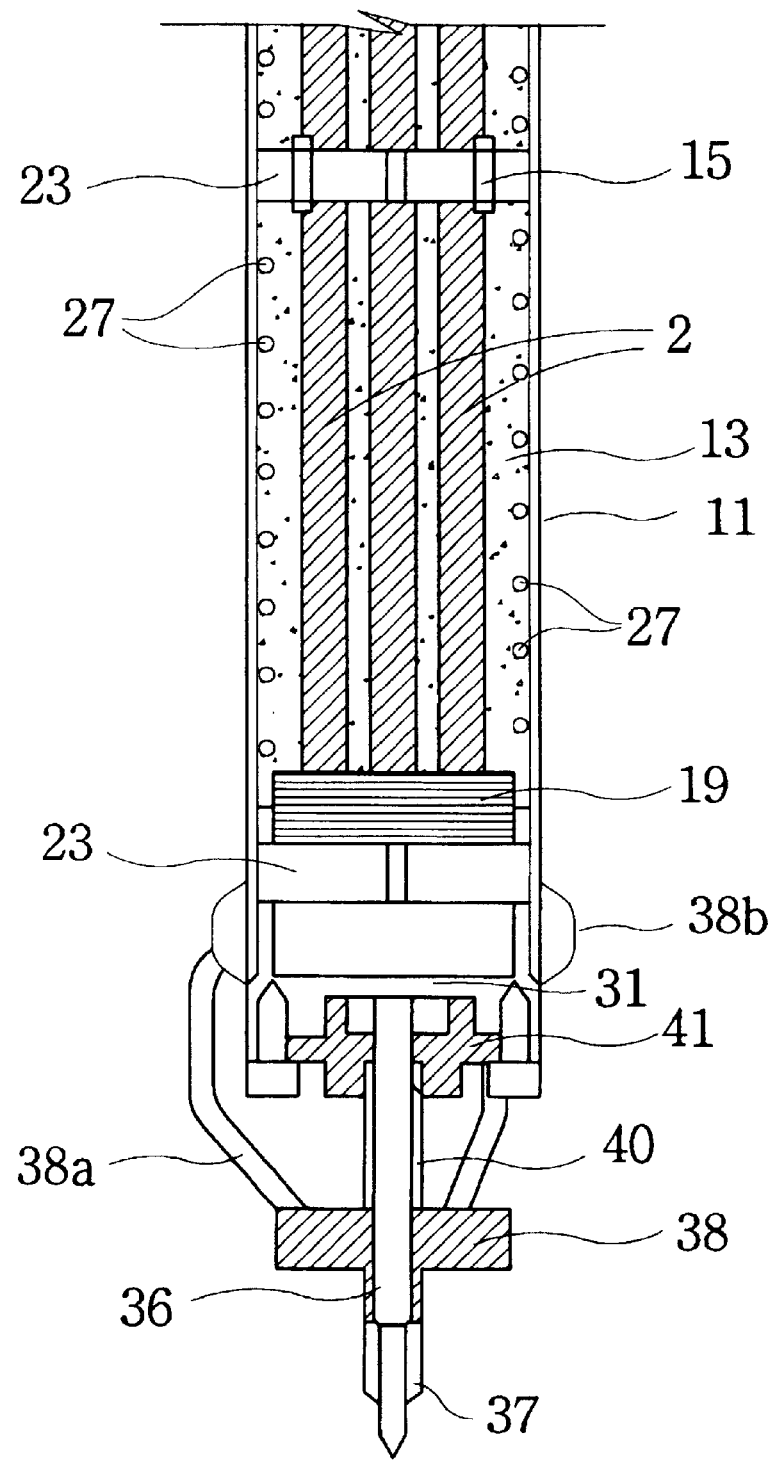

Reference should now be made to the drawings, in which the same reference numerals are used throughout the different drawings to designate the same or similar components.

As shown in FIG. 1, the instrumented capsule 1 according to a preferred embodiment of the present invention comprises a capsule main body 10 that is installed in an irradiation hole 103 of the research reactor pool 100. The instrumented capsule 1 also has a rigid protection tube 60, a flexible guide tube 70 and a junction box 80, which guide and connect a vacuum control pipe and several control wires extending from the interior of the main body 10 to a capsule control system 90 installed outside the reactor pool 100.

In a detailed description of the instrumented capsule 1 of the present invention, the main body 10 of the instrumented capsule comprises a shell 11 that defines the appearance of the main body 10 as shown in FIG. 2. Housed in the shell 11 are heat media 13 used for transmitting heat from heaters to specimens. The heat media 13 collaterally hold the specimens 2 of target materials at the center and peripheral areas thereof. A plurality of insulators 23 are interposed between adjacent heat media 13 and positioned above and under the upper and lower reflectors 19, respectively. The Thermocouples 25 are set in each of the heat media 13, and are used for sensing the temperature of the specimens 2. A dosimeter 29 is installed in each of the heat media 13 so as to measure the quantity of neutron radiation. The capsule main body 10 is loaded into the irradiation hole 103 of the research reactor.

The shell 11 of the main body 10 is a hollow cylindrical body, and the heat media 13 are sequentially set into the shell 11 along an axial direction of the shell 11. The specimens 2, made of a variety of target materials and having various shapes, are longitudinally set into the heat media 13, so the specimens 2 create a multi-staged specimen arrangement. The specimens 2 are fabricated in the form of rods with the same length and circular or rectangular cross-sections, and are installed in the shell 11 while being axially set at the center and peripheral areas of the heat media 13.

The number of the heat media 13 may be changed in accordance with test purposes and test environments. The heat media 13 collaterally act as specimen holders, and each have a plurality of specimen seating holes at the center and peripheral areas thereof as shown in FIG. 5b. The specimen seating holes of the heat media 13 have circular or rectangular cross-sections, and receive the specimens 2 therein. The circumferential surfaces of the heat media 13 come into close contact with the inner surface of the shell 11, and two adjacent media 13 are connected to each other by a plurality of connecting pins 15.

The thermocouples 25 are set into the circumferential portion of each heat medium 13 so as to detect the temperatures of the specimens 2 in the heat medium 13. The dosimeter 29 is installed in each heat medium 13 so as to measure the total neutron fluence.

A coiled heater 27 is installed around the circumferential surface of each heat medium 13 so as to generate heat. The heat from the heaters 27 is transferred to the specimens 2 through the heat media 13, thus heating the specimens 13 to the target temperature. As shown in FIGS. 4a and 4b, each of the heaters 27 is a sheath-heater, and is wrapped along a spiral groove 28 formed around the circumferential surface of an associated heat medium 13.

An upper reflector 19 is installed on the upper end of the uppermost heat medium 13, and a lower reflector 19 is installed under the lower end of the lowermost heat medium 13. The two reflectors 19 prevent upward and downward heat transfer from the uppermost and lowermost heaters 27 in axial directions of the shell 11. In order to fabricate each of the two reflectors 19, a plurality of circular discs 18 are layered and fastened together into a single body by using a fastening pin 20. The reflectors 19 thus have a multi-layered structure as shown in FIG. 6a.

In an effort to minimize axial heat transfer between adjacent heat media 13 having specimens 2, an insulator 23 is interposed between the adjacent heat media 13 as shown in FIGS. 7a and 7b. In such a case, the insulators 23 are each fabricated in the form of a circular disc having the same diameter of the heat media 13, and are locked to adjacent media 13 by the connecting pins 15.

A lower end plug 31 is mounted to the open lower end of the shell 11, while an upper end plug 33 is mounted to the open upper end of the shell 11. The upper and lower end plugs 33 and 31 thus seal the upper and lower ends of the shell 11. An upper guide spring unit 53 is fitted over the upper end of the shell 11, and comes into elastic and frictional contact with the inner surface of the irradiation hole 103 when the capsule main body 10 is installed in the irradiation hole 103. The upper guide spring unit 53 vertically places the shell 11 of the main body 10 at the center of the vertical irradiation hole 103. As shown in FIG. 12, the upper spring unit 53 has upper and lower fixing rings 52, at which the spring unit 53 is fitted over the shell 11. A plurality of wire springs 51 are connected between the upper and lower fixing rings 52 at regular positions, and are bent outward at their middle portions to project outward in radial directions. The wire springs 51 are thus brought, at their bent portions, into elastic and frictional contact with the inner surface of the irradiation hole 103 when the main body 10 is loaded in the irradiation hole 103. In the preferred embodiment of FIG. 12, the upper guide spring unit 53 has six wire springs 51 such that the capsule equipped with the spring unit 53 are loaded in an irradiation hole having a hexagonal cross-section. Of course, the number of the wire springs 51 may be changed in accordance with the cross-section of the irradiation hole in which the capsule main body 10 is installed.

A specimen compressing spring 43 is installed under the upper end plug 33, and compresses the specimens 2. In order to seat the specimen compressing spring 43, a spring seat 45 is installed in the shell 11 at a position above the uppermost insulator 23. Two spacers 47 and 49 are sequentially set in the shell 11 at a position between the spring seat 45 and the uppermost insulator 23, thus spacing the spring seat 45 from the uppermost insulator 23 at a desired interval.

As shown in FIG. 8, the upper end plug 33 has a central pipe hole 34 and six peripheral pipe holes 34. A vacuum control pipe 55, used for controlling the pressure of helium gas in the capsule main body 10 to control the degree of vacuum in said main body 10, passes through the central pipe hole 34 of the upper end plug 33, while six wiring pipes 57, which house the control wires extending from the thermocouples 25 and the heaters 27, pass through the six peripheral pipe holes 34. In such a case, the vacuum control pipe 55 and the six wiring pipes 57 are firmly held in the pipe holes 34 of the upper end plug 33 while accomplishing a sealing effect at the junctions of the pipes 55 and 57 and the pipe holes 34, and are guided to the junction box 80 by the protection tube 60 and the guide tube 70 while being protected by said tubes 60 and 70. The junction box 80 is installed outside the reactor pool 100, and connects the pipes 55 and 57 to the capsule control system 90.

As described above, the vacuum control pipe 55 and the wiring pipes 57 extending from the capsule main body 10 are guided to the junction box 80 via the protection tube 60 and the guide tube 70. Both the protection tube 60 and the guide tube 70 shield the vacuum control pipe 55 and the wiring pipes 57 from coolant in the reactor pool 100, and accomplish the air-tightness of the pipes 55 and 57. The junction box 80 is installed outside the reactor pool 100, and connects the pipes 55 and 57 to the capsule control system 90.

As shown in FIG. 13a, the junction box 80 has a guide tube connector 92 on its front surface, and the connector 92 connects the guide tube 70 to the junction box 80. In the junction box 80, the vacuum control pipe 55 and the control wires, such as wires extending from the heaters 25 and the thermocouples 27, are separated from each other. In order to separately connect the vacuum control pipe 55 and the control wires to the associated parts of the capsule control system 90, the rear surface of the junction box 80 is provided with several connectors, that is, a thermocouple control wire connector 93, a heater control wire connector 94, a vacuum control pipe connector 95, and a pressurizing tube connector 96.

A grab hook 83 and a grapple head 84 are provided at the uppermost end of the protection tube 60 connected to the upper end of the capsule main body 10 as shown in FIG. 3. The grab hook 83 and the grapple head 84 are used in the process of moving, loading or unloading the capsule main body 10. In a detailed description, the capsule main body 10 is movable in the research reactor, with the grab hook 83 caught by an overhead crane (not shown) positioned above the reactor pool 100. The grapple head 84 is used for rotating the capsule main body 10 so as to fix or remove the main body 10 to or from a receptacle 105 provided at the bottom of the irradiation hole 103. That is, the capsule main body 10 is loaded or unloaded in or from the irradiation hole 103.

A lower fixing unit 35, which is used for fixing the shell 11 of the capsule main body 10 to the receptacle 105 of the irradiation hole 103, is mounted to the shell 11 at a position under the lower end plug 31. As shown in FIG. 9a, the lower fixing unit 35 comprises a lower end cap 41, a rod tip 36, a stopper 38, and a stopper spring 40. The lower end cap 41 is mounted to the lower end plug 31, while the rod tip 36 is connected to the center of the lower end cap 41 and vertically extends downward. The stopper 38 is movably fitted over the rod tip 36, while the stopper spring 40 is fitted over the rod tip 36 at a position between the stopper 38 and the lower end cap 41, thus normally biasing the stopper 38 downward in a vertical direction.

The rod tip 36 is a slim shaft, with two locking blades 37 formed on the lower portion of the rod tip 36 at diametrically opposite positions as shown in FIG. 9a. The rod tip 36 with the two locking blades 37 passes through the fixing slot 106 of the receptacle 105 provided at the bottom of the irradiation hole 103. The fixing slot 106 has two blade spaces allowing the two locking blades to pass through the fixing slot 106, and two locking recesses 106a are formed on the lower surface of the receptacle 105 such that the locking recesses 106a cross the locking slot 106 having the two blade spaces. The stopper 38 is provided with a plurality of holes 39 which allow the coolant flowing from the bottom of the irradiation hole 103 to smoothly flow upward through the stopper 38 without being disturbed by the stopper 38. The guide pins 38a are provided at the circumferential surface of the stopper 38 such that the guide pins 38a are bent outward in radial directions. The guide pins 38a thus come into contact with the inner surface of the irradiation hole 103 when the capsule main body 10 is installed in the irradiation hole 103. The upper ends of the guide pins 38a are connected to an annular ring 38b, thus being supported by the ring 38b, as best seen in FIG. 9b. That is, the lower fixing unit 35 of the capsule main body 10 according to the present invention reinforces the guide pins 38a by the annular ring 38b, so the lower fixing unit 35 effectively resists the torsion force applied thereto and effectively endures the stress caused by the torsion force even when the grapple head is rotated during the process of fixing the capsule main body 10 in the irradiation hole 103, different from a conventional lower fixing unit lacking such an annular ring, as shown in FIG. 9c.

The process of assembling and installing the instrumented capsule 1 of the present invention and a material irradiation test performed with the capsule 1 will be described herein below.

In order to fabricate the main body 10 of the instrumented capsule 1 for a material irradiation test, the heat media 13 with the specimens 2, lower fixing unit 35, lower end plug 31, insulators 23, reflectors 19, thermocouples 25, dosimeters 29, heaters 27, spacers 47 and 49, specimen compressing spring 43, upper end plug 33, and the guide spring unit 53 are set in or mounted to the shell 11, thus assembling the capsule main body 10.

Thereafter, at the upper end plug 33 of the capsule main body 10, the vacuum control pipe 55 and the wiring pipes 57 for the control wires extending from the thermocouples 25 and the heaters 27 are inserted into the protection tube 60 so as to be air- and water-tightly guided to the junction box 80 through the protection tube 60 and the guide tube 70. The outside end of the guide tube 70 is connected to the guide tube connector 92 which is provided on the front surface of the junction box 80 installed at the upper portion of the reactor pool 100. In addition, at the rear surface of the junction box 80, the vacuum control pipe 55 and the control wires are separately connected to the associated parts of the capsule control system 90 through the several connectors provided at the rear surface of the junction box 80. The instrumented capsule 1 for the material irradiation test is thus completely installed in a research reactor.

In other words, the protection tube 60 is connected at its inside end to the upper end plug 33, and at its outside end to the guide tube 70, thus guiding the vacuum control pipe 55 and the control wires to the guide tube 70. The outside end of the guide tube 70 is connected to the guide tube connector 72 provided at the front surface of the junction box 80, and so the vacuum control pipe 55 and the control wires are connected to the junction box 80. The vacuum control pipe 55 and the control wires are, thereafter, connected to the capsule control system 90 through the connectors provided at the rear surface of the junction box 80.

Thereafter, the grab hook 83 of the capsule main body 10 is coupled to the overhead crane (not shown) positioned above the reactor pool 100, and primarily places the capsule main body 10 in the irradiation hole 103. Thereafter, the grapple head 84 is rotated to fix the capsule main body 10 in the irradiation hole 103 of the reactor pool 100.

During the process of installing the capsule main body 10 in the irradiation hole 103 of the reactor pool 100, the lower fixing unit 35 provided at the lower end of the shell 11 is fixed to the receptacle 105 which is placed on the bottom of the irradiation hole 103 as shown in FIG. 11. During the process of fixing the lower fixing unit 35 to the receptacle 105, the receptacle 105 primarily catches the stopper 38 of the fixing unit 35. In such a case, only the rod tip 36 passes through the fixing slot 106 of the receptacle 105, while the stopper spring 40 is compressed by an external force. After the rod tip 36 completely passes through the slot 106 of the receptacle 105, the capsule main body 10 is rotated at an angle of 90° by the grapple head 84 such that the two locking blades 37 of the rod tip 36 are positioned under the two locking recesses 106a of the receptacle 105. Thereafter, the external force is removed from the capsule main body 10, and so the stopper 38 is biased upward by both the liquid pressure of the coolant flowing upward from the position under the receptacle 105 and the restoring force of the stopper spring 38. The two locking blades 37 of the rod tip 36 are seated into the two locking recesses 106a of the receptacle 105. The installation of the capsule main body 10 in the irradiation hole 103 is accomplished.

After the capsule main body 10 is completely loaded into the irradiation hole 103 as described above, the protection tube 60, placed in the coolant inside the reactor pool 100, is supported by a clamp robot arm 108. The instrumented capsule 1 is completely installed in the reactor pool 100.

Thereafter, a desired material irradiation test using the capsule 1 is performed. During the material irradiation test, the specimens 2 housed in the shell 11 of the capsule main body 10 are irradiated. In such a case, the temperature inside the shell 11 is controlled by the thermocouples 25 and the heaters 27 wound around the spiral grooves 28 of the heat media 13, in addition to the helium gas atmosphere inside the shell 11.

That is, the thermocouples 28 installed on the heat media 13 detect the temperatures of the specimens 2, and output temperature signals to the capsule control system 90. Upon receiving the temperature signals from the thermocouples 28, the capsule control system 90 controls the pressure of the helium gas flowing to the vacuum control pipe 55, thus controlling the heat transfer rate inside the shell 11 and controlling the output power of the heaters 27. For example, when the temperature of the specimens 2 is lower than a predetermined reference point or a predetermined target point, for example, 290° C.±10° C., the degree of vacuum in the shell 11 is increased to reduce the quantity of heat transferred from the interior of the shell 11 to the coolant flowing around the shell 11 and the sheath-heaters 27 are operated to generate heat. In such a case, heat dissipated from the heaters 27 is uniformly transferred to the surfaces of the specimens 2 through the heat media 13 surrounding the specimens 2, thus increasing the temperature of the specimens 2 to a desired point. The dosimeters 29, installed around the specimens 2 in the heat media 13, detect and measure the quantity of neutron, radiation of the irradiated specimens 2. During such a material irradiation test in a research reactor, the capsule main body may interfere with adjacent structures due to its vibration caused by flow-induced vibration. Therefore, it is necessary to install the capsule in the research reactor in accordance with regulations defined by law. That is, the upper guide spring unit 53 is fitted over the upper end of the shell 11 as shown in FIGS. 2, 4a and 12, and comes into elastic and frictional contact with the inner surface of the irradiation hole 103 when the capsule main body 10 is installed in the irradiation hole 103. The upper guide spring unit 53 thus vertically places the shell 11 of the main body 10 at the center of the vertical irradiation hole 103 inside, and prevents the shell 11 from being unexpectedly eccentrically placed in the irradiation hole 103. The desired structural integrity of the capsule main body 10 is thus maintained. The lower fixing unit 35 provided at the lower end of the capsule main body 10 firmly fixes the capsule main body 10 in the vertical irradiation hole 103.

When loading the instrumented capsule 1 of the present invention in an irradiation hole 103 of a reactor pool 100, the grab hook 83 provided at the upper end of the capsule main body 10 is coupled to an overhead crane, and is moved to a desired position above the reactor pool 100 by the crane. Thereafter, the grapple head 84 of the capsule main body 10 is connected to an appropriate tool (not shown), and is rotated by the tool so as to fix the capsule main body 10 to the receptacle 105 provided at the bottom of the irradiation hole 103.

In the instrumented capsule 1 of the present invention, the guide pins 38a are reinforced by the annular ring 38b which supports the upper ends of the guide pins 38a as shown in FIGS. 9b and 10. The present invention thus allows the guide pins 38a, which have been recognized as the most easily breakable parts in the case of conventional instrumented capsules, to have a stable structure capable of effectively resisting both a tensile load applied to the guide pins 38a in an axial direction of the capsule main body 10 and a bending load applied to the guide pins 38a in a transverse direction of the capsule main body 10.

As described above, the present invention provides an instrumented capsule for material irradiation tests in research reactors. In the instrumented capsule of the present invention, specimens are housed in the shell of a capsule main body such that the specimens create a multi-staged specimen arrangement. The temperature of the specimens during a material irradiation test is detected by thermocouples, and is controlled by heaters, spirally wound around the external surfaces of the heat media, in accordance with the detected results. In addition, the temperature of the specimens during the material irradiation test is also indirectly controlled by controlling the heat transfer rate inside the shell. In such a case, the heat transfer rate inside the shell is controlled by controlling pressure of the helium gas atmosphere in the shell. Therefore, it is easy to control the temperature of the specimens housed in the shell of the capsule main body, so the capsule of the present invention performs an optimum material irradiation test.

In the capsule of the present invention, the vacuum control pipe and several control wires extending from the heaters and thermocouples are connected to the capsule control system through a junction box. The junction box of the present invention has a small size and light weight, different from conventional junction units, so it is easy and convenient for workers to handle the junction box. During a material irradiation test in a research reactor, the capsule main body may interfere with adjacent structures due to its vibration caused by flow-induced vibration. In order to prevent such interference of the capsule main body with adjacent structure, an upper guide spring unit is fitted over the upper end of the shell such that the guide spring unit comes into elastic and frictional contact with the inner surface of the irradiation hole when the capsule main body is loaded into the irradiation hole. The upper guide spring unit thus vertically places the capsule main body at the center of the vertical irradiation hole inside, and prevents the capsule main body from being unexpectedly and eccentrically placed in the irradiation hole. Desired structural integrity of the capsule main body is thus maintained.

In the instrumented capsule, the guide pins, provided at the lower end of the capsule main body, are reinforced by an annular ring, thus having a stable structure, different from conventional guide pins which have been recognized as the most easily breakable parts of instrumented capsules. The guide pins thus more effectively endure a tensile load and a bending load during the process of loading/unloading the capsule main body.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An instrumented capsule for material irradiation tests in research reactors, comprising:
   a capsule main body installed in a vertical irradiation hole of a research reactor pool, said capsule main body consisting of:
   a shell opened at upper and lower ends thereof;
   a plurality of heat media set in said shell;

a plurality of specimens set at a center and peripheral areas of each of the heat media;

upper and lower reflectors installed on an upper end of an uppermost heat medium and under a lower end of a lowermost heat medium, respectively;

a plurality of insulators interposed between adjacent heat media and positioned above and under the upper and lower reflectors, respectively;

a spacer set in said shell at a position above an uppermost insulator;

a spring seat installed above the spacer;

a specimen compressing spring to bias the spring seat, thus compressing the specimens;

temperature control means for controlling a temperature inside the shell, said temperature control means consisting of a vacuum control pipe and a heater;

detecting means consisting of both a thermocouple used for detecting a temperature of the specimens and a dosimeter used for detecting a quantity of neutron radiation;

upper and lower end plugs mounted to the upper and lower ends of the shell so as to seal the ends of said shell; and a lower fixing unit assembled with the lower end plug; and connecting means for connecting said capsule main body to a capsule control system installed outside the reactor pool.

2. The instrumented capsule according to claim 1, wherein an upper guide spring unit is fitted over the upper end of said shell so as to place the capsule main body at a center of the vertical irradiation hole, said upper guide spring unit consisting of upper and lower fixing rings fitted over said shell, and a plurality of wire springs connected between the upper and lower fixing rings and projected outward in radial directions so as to come into contact with an inner surface of the irradiation hole when the capsule main body is installed in the irradiation hole.

3. The instrumented capsule according to claim 1, wherein said heat media are brought, at external surfaces thereof, into contact with an inner surface of the shell, and each have one or more specimen seating holes to receive the specimens.

4. The instrumented capsule according to claim 3, wherein said specimen seating holes have circular or rectangular cross-sections in a same manner as the specimens, and are formed at the center and peripheral areas of each of the heat media.

5. The instrumented capsule according to claim 1, wherein said lower fixing unit comprises:

a lower end cap mounted to said lower end plug;

a rod tip connected to a center of said lower end cap and vertically extending downward, with a plurality of locking blades formed on a lower portion of said rod tip and locked to a fixing slot formed on a receptacle provided in said irradiation hole;

a stopper movably fitted over said rod tip; and a stopper spring fitted over said rod tip at a position between the stopper and the lower end cap, thus normally biasing the stopper downward in a vertical direction.

6. The instrumented capsule according to claim 5, wherein said stopper comprises:

a plurality of holes formed in said stopper so as to allow a coolant flowing from the bottom of the irradiation hole to smoothly flow upward through said stopper without being disturbed by the stopper;

a plurality of guide pins projected on a circumferential surface of said stopper in radial directions such that the guide pins come into contact with the inner surface of said irradiation hole when the capsule main body is installed in the irradiation hole; and an annular ring connecting outside ends of said guide pins so as to support said guide pins.

7. The instrumented capsule according to claim 1, wherein said connecting means comprises:

a rigid protection tube connected to an upper end of said capsule main body so as to guide said vacuum control pipe and said thermocouple end said heater having several control wires control wires extending from there from inside said capsule main body while protecting said vacuum control pipe and said control wires;

a flexible guide tube connected to said protection tube so as to guide said vacuum control pipe and said control wires; and a junction box connected to said guide tube pipe so as to connect said vacuum control pipe and said control wires to said capsule control system installed outside the reactor pool, thus acting as a medium which transmits signals to the capsule control system.

* * * * *

UNITED STATES PATENT AND TRADEMARK OFFICE
CERTIFICATE OF CORRECTION

PATENT NO. : 6,697,446 B2
DATED : February 24, 2004
INVENTOR(S) : Kang et al.

It is certified that error appears in the above-identified patent and that said Letters Patent is hereby corrected as shown below:

Column 14,
Line 34, "end" should be corrected to read -- and --.

Signed and Sealed this

Seventeenth Day of August, 2004

JON W. DUDAS
*Acting Director of the United States Patent and Trademark Office*